United States Patent

Smith et al.

[11] Patent Number: 5,863,317
[45] Date of Patent: Jan. 26, 1999

[54] APPARATUS FOR GAS LIQUID SEPARATION

[75] Inventors: John Cambridge Smith, Upper Beeding; Alex George Hunter, Richmond, both of United Kingdom

[73] Assignee: The BOC Group plc, Windlesham Surrey, England

[21] Appl. No.: 885,508

[22] Filed: Jun. 30, 1997

Related U.S. Application Data

[63] Continuation of Ser. No. 316,165, Sep. 30, 1994, abandoned.

[30] Foreign Application Priority Data

Oct. 1, 1993 [GB] United Kingdom ................... 9320231

[51] Int. Cl.⁶ .................................................. B01D 33/06
[52] U.S. Cl. .............................. 96/189; 55/409; 55/498; 55/502; 55/524; 96/196; 96/214
[58] Field of Search .............................. 55/409, 498, 502, 55/524; 95/258, 261, 270, 277, 282; 96/187, 189, 196, 204, 214, 216, 217

[56] References Cited

U.S. PATENT DOCUMENTS

| | | | |
|---|---|---|---|
| 1,580,380 | 4/1926 | MacDonald | 55/409 |
| 2,596,384 | 5/1952 | Dunmire | 96/196 |
| 3,378,104 | 4/1968 | Venable | 55/409 |
| 3,708,957 | 1/1973 | Labadie | 95/277 |
| 4,049,401 | 9/1977 | Smith | 55/409 |
| 4,217,120 | 8/1980 | Reynolds | 55/409 |
| 4,415,342 | 11/1983 | Foss | 95/277 |
| 4,687,585 | 8/1987 | Ramshaw | 95/261 |
| 4,715,869 | 12/1987 | Ramshaw | 96/214 |
| 5,415,676 | 5/1995 | Tokar et al. | 55/486 |

*Primary Examiner*—C. Scott Bushey
*Attorney, Agent, or Firm*—David M. Rosenblum; Salvatore P. Pace

[57] ABSTRACT

An apparatus for separating a gas-liquid mixture into component parts having a coalescing filter mounted on a rotatable shaft. The gas-liquid mixture is directed to the coalescing filter in a generally radial inward direction relative to the shaft and the retained liquid is spun in a generally radial outward direction from the filter by centrifugal force associated with the rotation of the shaft and thereby the coalescing filter.

14 Claims, 4 Drawing Sheets

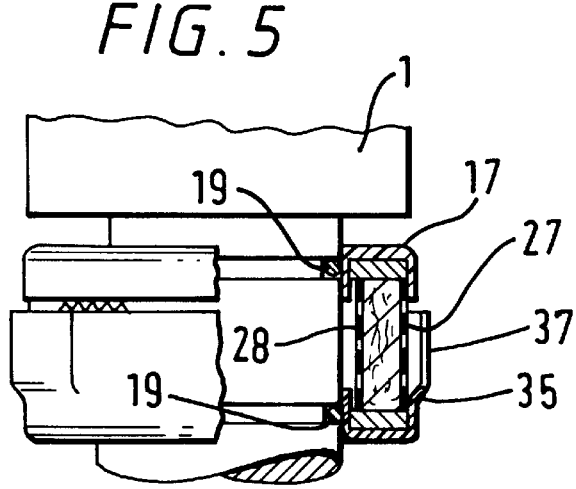
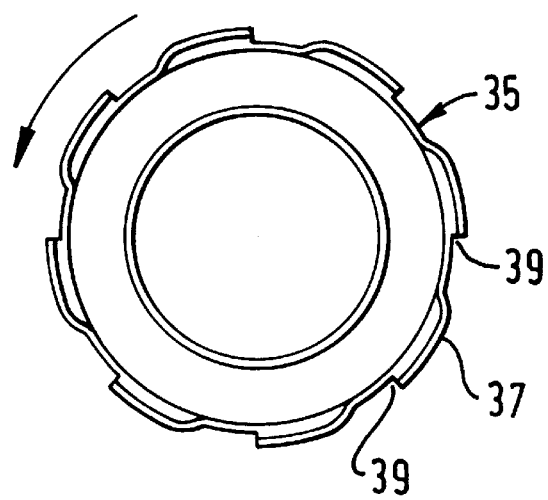
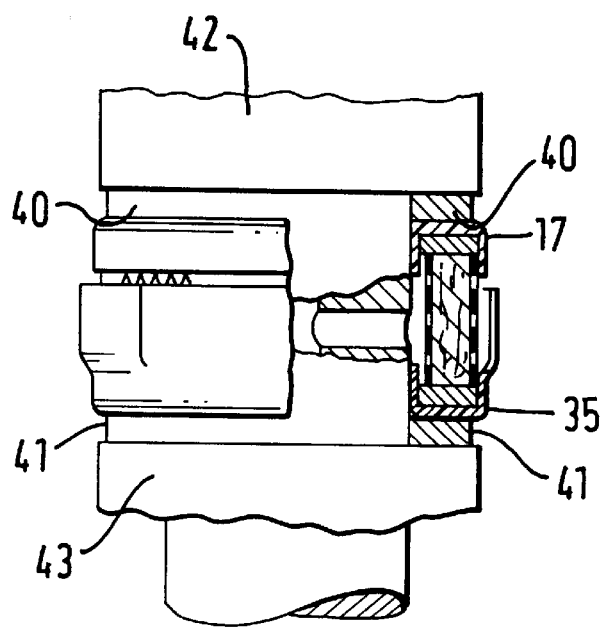

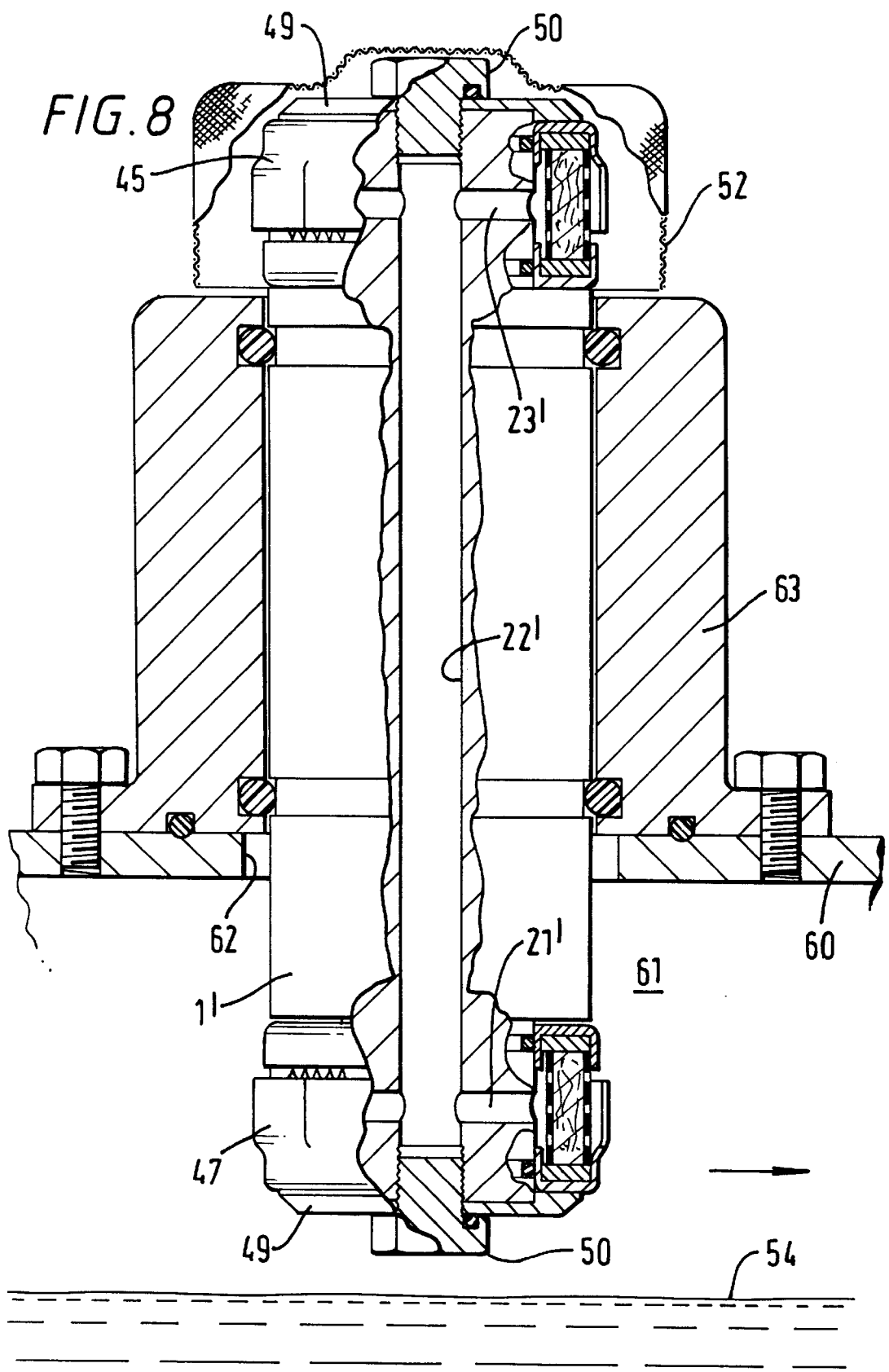

APPARATUS FOR GAS LIQUID SEPARATION

This is a continuation of application Ser. No. 08/316,165 filed Sep. 30, 1994, now abandoned.

BACKGROUND OF THE INVENTION

This invention relates to methods and apparatus for the separation of contaminant materials from gas-liquid and/or gas solid aerosols or other gas-liquid mixtures and their application to certain types of machinery.

There are numerous instances where it is expedient to separate gas-liquid mixtures, for example, where the gas is required to be separated from a "mist" of fine liquid droplets either because of considerations of environmental cleanliness or because one or both of the component parts of the mixture need to be recycled. It will also be expedient in many instances to separate gas-liquid-solid mixtures (e.g. including solids which are wear products of rotating machinery) and/or gas/vapor mixtures, e.g. mixtures of air and a hydrocarbon vapor. Such mixtures, which can include liquid and solid particles and possibly vapor, are generically referred to as "polydispersed aerosols".

Filters are known which can bring about such a separation. In particular, coalescing filters are known in which a gas containing small suspended droplets of liquid such as oil or the like—commonly referred to as a "mist" is separated and the liquid is retained in the filter. Coalescing filters can be made from a variety of materials including glass microfibers, especially borosilicate glass microfibers. It has recently been proposed to surface treat the microfibers with a flurochemical or other material that imparts oleophobic and/or hydrophobic properties, and such treated coalescing filters may also be usable for present purposes. Coalescing filters are generally of annular or tubular shape and may be formed by molding or pleating sheets of microfibers. In the case of molding, in particular, it may be desirable to include a binder resin which also can modify the surface energy of the fibers, for example, an epoxy resin or a silicone resin or a mixture or resins, to optimize filtration efficiency. Coalescing filter elements are generally formed with a mechanical support structure, for example, a layer of expanded metal, in contract with one or both of the surfaces of the coalescing filter element, and having sufficient open area as not to interfere with the filter operation.

This invention is based on the discovery that the use of rotary coalescing filters can improve the separation of a gas-liquid mixture (including a polydispersed aerosol) with relatively low pressure drop across the filter, approximating to dry filter performance when the filter is rotated at a range of speeds. Such operating conditions may include cyclical duty in which rpm is varied and, at the higher speed of the duty range, liquid is centrifuged from the filter. The invention is useful especially in the case where a gas-liquid stream to be separated is urged through the filter from a predetermined direction.

UK Patent Specification No. 1508212 (Rolls Royce) shows a centrifugal separator for separating a suspension of a liquid in a gas which comprises a rotatable chamber, an inlet to the chamber for admitting the suspension and an outlet for the chamber in a radially outer part of the chamber, said outlet being separated from the inlet. An outlet for gas is provided in a part of the chamber disposed radially inwardly of the liquid outlet. A packing is provided within the chamber which comprises a relatively rigid matrix which is a metallic mesh formed by plating the metal onto a semi-synthetic open celled foam structure and subsequently removing the synthetic material. As will become apparent from the following discussion of the present invention, the gas flow path into the packing is axial rather than radial, and the packing material used is significantly coarser than the microfibrous materials contemplated by this invention.

SUMMARY OF THE INVENTION

In one aspect of the invention, there is provided a method of separating a gas-liquid mixture into its component parts, which method comprises urging the mixture through a coalescing filter and thereby causing the liquid to be preferentially retained therein and the gas preferentially to pass therethrough, wherein the coalescing filter is mounted on a rotatable shaft and the gas liquid mixture is directed to the filter in a generally radially inward direction relative to the shaft, and wherein retained liquid is spun in a generally radial outward direction from the filter by centrifugal force associated with the rotating filter.

The invention is especially applicable to the separation of gas-liquid mixtures contained in a chamber. Accordingly, the invention also provides a method of separating a gas-liquid mixture in which the gas-liquid mixture is contained with a substantially closed chamber and means are provided to remove at least one of the separated components from the chamber. It has been found that it is particularly desirable for the gas-liquid mixture to be urged into the filter in a generally radial inward direction relative to the shaft so that the inwardly flowing gas-liquid stream and the outwardly flowing liquid being spun from the filter by centrifugal forces occupy the same volume and therefore interact. It is believed, in particular, although the invention is not dependent on the correctness of this theory, that the emergent stream of coalesced liquid droplets that is discharged from the outer surface of the rotating filter amalgamate with the inwardly flowing fine droplets carried by the gas-liquid stream and, therefore, grow in size. It is believed that this mechanism can contribute significantly to the coalescence achieved.

In accordance with a preferred overall objective of the invention to separate the mixture and thereafter to collect at least one component thereof, the invention also provides means for removing one component, normally the gaseous component, from the chamber and preferably to recycle at least a part of said gaseous component into the chamber.

The invention provides as a preferred embodiment in this respect a method of separating a gas-liquid mixture in which the separated component is the gas which is removed from the chamber by means of an internal bore in the shaft, preferably a bore which is substantially axially oriented.

Preferably, the filter is of annular or tubular shape and is attached to the shaft in concentric fashion. In addition, it is also preferred that the gas outlet side of the filter should communicate with the substantially axially oriented bore by means of one or more substantially radially oriented bores in the shaft, the latter generally being in position within the filter.

In general, the invention is particularly suitable for use in machinery or equipment in which lubricating oil and the like is employed. This may, for example, be any type of machinery which incorporates a gear drive mechanism. Such machinery tends to produce in use in the area of the gear box a gas-liquid mixture in which the gas component is air or, possibly, a purged gas such as nitrogen or mixtures of air and nitrogen, and the liquid component is in the form of small droplets of lubricant or the like which are dispersed in or suspended by the gas component. In such machinery or equipment, the gears themselves will generally be engaging a shaft and the gear box will represent a substantially closed chamber containing a gear drive mechanism with a shaft or shafts passing through the walls thereof. A drive motor itself may be within or without the chamber.

One particular example of such machinery or equipment is certain types of vacuum pumps in which it is desirable for the gear drive mechanism to be contained in a chamber the interior of which can be physically isolated from the pumping chambers thereof. This is especially the case with "dry" vacuum pumps which are used extensively in applications, for example semiconductor manufacture, where it is essential for the pump lubricants not to contaminate the pumping chambers so as to obviate the danger of lubricant contamination of the semiconductor or the like equipment being subjected to vacuum condition. Such "dry" vacuum pumps commonly possess two shafts each one carrying a set of rotors and being positioned in the pump body such that corresponding rotor pairs (one from each shaft) interengage to effect the pumping action within their own pumping chamber. The ends of the shafts remote from the pumping chambers generally possess intermeshing gears, and one of the shafts is rotated by means of a motor to effect rotation via the gears of both shafts in opposite direction thereby effecting the pumping actin by the rotor pairs. To avoid contamination of the pumping chambers, the gear drive mechanism, the ends of the shafts and preferably the motor itself are all contained in a separate chamber sealed from the pumping chamber by shaft seals and other seals. The lubricants and cooling fluids associated with the gear drive mechanism are therefore also contained within their separate chamber. The methods of the invention are particularly suitable for such vacuum pumps. The droplets of liquid lubricant caused by the rotating gears in particular form a liquid air mixture within the chamber containing the gears which can be separated in accordance with the invention.

Ideally, in such pumps, the filter is, in accordance with preferred embodiments of the invention, annular in shape and is mounted concentrically about one of the shafts, normally the non-driven shaft, and an internal bore passageway linking the gas outlet from the filter to a point outside that chamber is provided.

Means must be provided to urge the gas liquid mixture through the filter. This may be provided by a positive pressure at the exterior surface of the filter or by a negative pressure to the interior of the filter. Such means can be, for example, the introduction of a flow of air or, preferably, an inert gas such as nitrogen, into the chamber through the filter and through the shaft bore or passageway and thereby to the outside of the chamber. Preferably, the air or inert gas is then caused to recirculate back into the chamber on a continuous flow basis, with the whole of the gas flow, or a part of the gas flow being recirculated. Such recirculation may conveniently be provided by incorporating means into the same pump to return air or gas passing through the shaft back into the chamber, for example by means of a screw thread on the rotating shaft at a point where the shaft is in close proximity to a pump body portion so that the air/gas is fed down the outside of the shaft and back into the chamber. Alternatively, a small air pump could be employed. In such ways, there is a continuous feed of air/gas through the filter.

It is also possible to urge the gas-liquid mixture through the filter by introducing a pressure differential across the filter so that the higher pressure is at the filter inlet stage. Equally, it is envisaged that the method of the invention may be caused to operate only when such a pressure differential exists in practice.

The filter rotates with the shaft and the liquid component will generally be retained therein. Once retained, droplets coalesce to form sufficiently large drops of liquid, said drops are ejected from the filter by centrifugal force and, for example, allowed to fall under gravity into the pump oil sump or will exit radially with sufficient velocity to impact on the nearest available surface.

The coalescing filter itself may be any type of filter falling within this general classification and may have a coalescing layer alone or a coalescing layer and an external drainage layer, and may be any of the types referred to in the introduction to this specification.

The invention also provides in an alternative aspect a gearbox or other chamber which in use contains contaminant material in the form of an aerosol having an internal space in which there is a rotatable shaft, a coalescing filter carried by and rotatable with the shaft, a means for establishing a flow of liquid-contaminated gas in the internal space through the filter into a hollow interior of the shaft, characterized in that the coalescing filter presents a generally cylindrical exterior surface to the internal space for gas inflow into the filter in a generally radial direction and for generally radial ejection of coalesced liquid.

A coalescing filter having a flow path as aforesaid has been found in principle to be suitable for shafts having rotational speeds up to about 13,000 rpm, typically 500–10,000 rpm, e.g. 2000–6000 rpm. Embodiments of the coalescing filter can exhibit high filtration efficiency, and pressure drop of about 4–5 cm of water at running speeds of e.g. 2,500–5,000 rpm.

The coalescing filter may be of any of the general types described above. There may be an additional requirement to remove contaminant vapor, e.g. a hydrocarbon vapor which may be present together with oil mist in a gearbox especially if the operating temperature is elevated. Such hydrocarbon vapors may be removed by an adsorbent material such as activated carbon which may be provided in a layer located downstream of the coalescing element with reference to the intended direction of gas flow.

BRIEF DESCRIPTION OF THE DRAWINGS

For a better understanding of the invention, various embodiments will now be described by way of example only with reference to the accompanying drawings in which:

FIG. 5 s a partly sectional view of a fourth form of filter incorporating a splash guard;

FIG. 6 is a plan view of a combined end cap and splash guard forming part of the filter of FIG. 5;

FIG. 7 is a partly sectional view of a fifth form of coalescing filter; and

FIG. 8 is a diagrammatic section of a hydraulic tank filtered with inlet and coalescing filters over a rotatable shaft.

DETAILED DESCRIPTION

Figure 1:
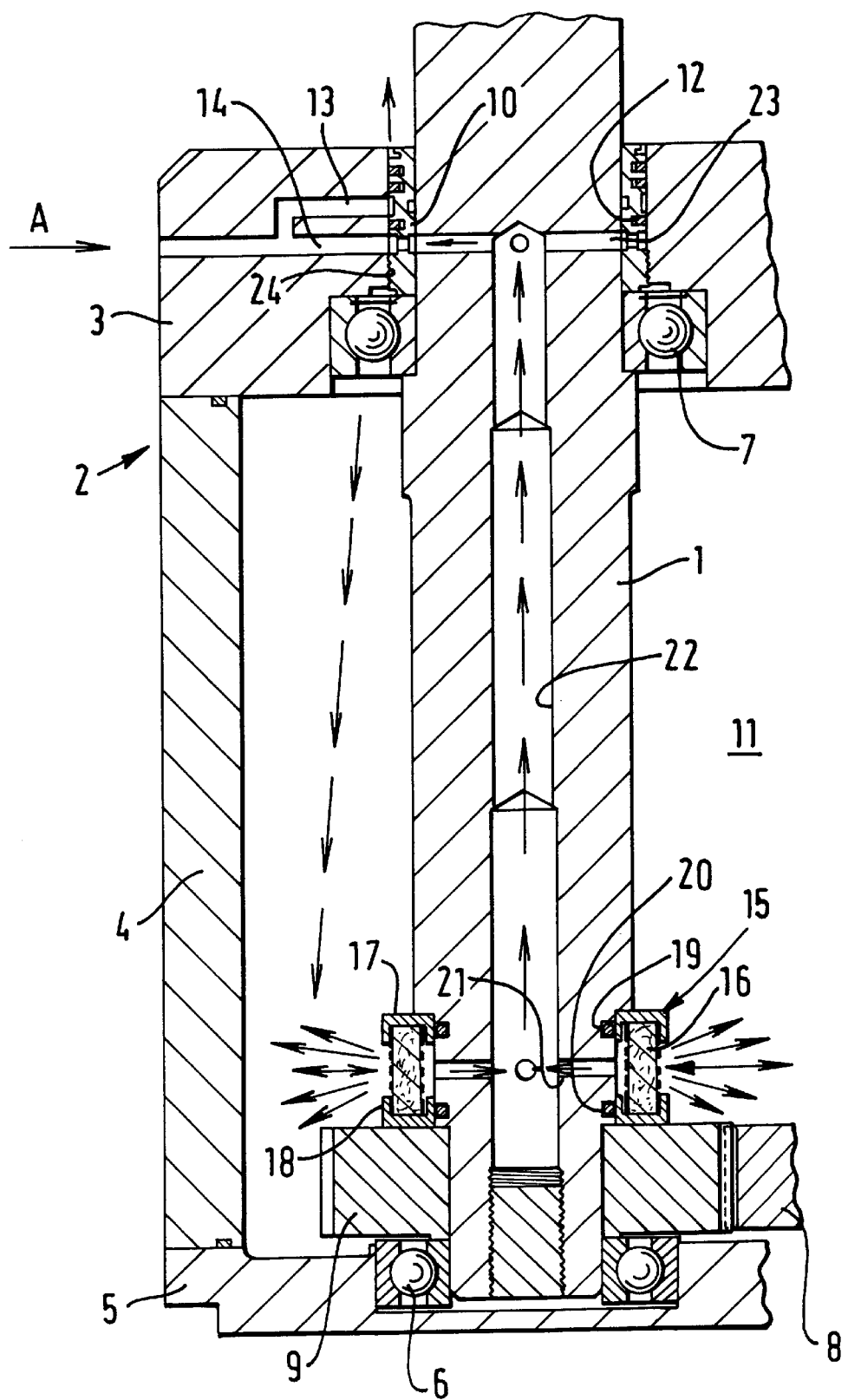
FIG. 1 is a sectional view showing part of a "dry" vacuum pump employed in the method of the invention.

FIG. 1 of the accompanying drawings shows part of a vacuum pump comprising a shaft 1 positioned within a pump body 2 which includes, as shown, three body portions 3,4,5, all of which are sealingly fixed together. The shaft 1 is mounted for rotation in the body 2 by means of bearings 6 in the body portion 5 and bearings 7 in the body portion 3. The vacuum pump is of the type having a second shaft (not shown) whose axis is parallel to the shaft 1. The shafts have respective gears 8, 9, which engage each other. Means (not shown) are provided to rotate the second shaft about its longitudinal axis with the interengaging gears 8, 9 causing the shaft 1 to rotate also. The gears and the drive motor (not shown) generally require lubrication, and it is the oil employed for this purpose that contaminates an internal chamber 11 within which the shaft 1 rotates with a mist of oil suspended in the air or gas present in the chamber. The term "oil" is not limited to hydrocarbon oil or mineral oil but is defined to include any lubricating liquid.

The shaft 1 is sealed within the body portion 3 by means of shaft seals in the form of a series of piston rings 12 contained in a piston ring carrier 10 secured to and rotatable with the shaft 1. This ensures that the chamber 11 in which the lower parts (as viewed in FIG. 1) of the two shaft are contained is sealed from the pumping chambers of the vacuum pump which are positioned above the body portion 13 as viewed in FIG. 1. One of the piston rings 12 is positioned between passageways 13, 14 in the body portion 3 so that a flow of gas, for example nitrogen, from a common source A can be passed to either side of the ring 12 so as to equalize pressure across it, thereby assisting sealing and causing a generally upward flow of gas (as viewed in FIG. 1) across the piston rings above the passageway 13 and hence into the pump outlet.

The shaft 1 is adapted to carry an annular filter 15 in concentric fashion for rotation therewith. The filter comprises an annular coalescing filter element 16 supported at either end by annular end caps 17, 18 of U-shaped cross section as shown and which are themselves sealingly fixed to the shaft 1 by means of O-rings 19, 20. For this purpose, the end caps 17 have cylindrical annular surfaces of sufficient axial extent to fit tightly onto O-rings 19 with clearances either side. The filter element 16 is further supported and constrained on its outer and inner surfaces by two annular expanded metal components conforming in shape to, and in contact with, the inner and outer surfaces of the filter element. There is a gas flow path from the chamber 11 through the outer annular expanded metal component in a generally radial direction through the coalescing filter element 16 and from the inner expanded metal component into a series of six equally spaced radially directed bores 21 in the shaft 1 (two of which appear in FIG. 1). The bores 21, themselves, communicate with a further bore 22 directed axially along the shaft 1. The bore 22 is sealed at the base (as shown) of the shaft and at its upper end communicates in the vicinity of the body portion 3 with a further set of six radially oriented bores 23 which extend through radial drillings in the piston ring carrier 10 to the outer surface of the carrier 10.

The piston ring carrier 10 has on the lowermost part of its outer curved surface a two start screw or scroll 24 whose turns afford communication between the bores 23 and the chamber 11. In use of the vacuum pump, as the shaft 1 is rotated at high speed, the method of the invention allows air or gas present within the chamber 11 to be urged continuously towards the filter element 16 which it enters in a generally radial direction as shown by the heavier arrows in FIG. 1 and thence to circulate through the filter element 16 into the bores 21 and then 22 and finally via the bores 23 where it is returned via the screw 24 back into the chamber 11. The rotation of the screw or scroll 24 itself provides the driving force for recirculation of air or gas in the manner illustrated.

In accordance with the method of this invention, oil droplets suspended in the air or gas which are drawn into the filter element 16 are retained therein by virtue of the physical properties of the coalescing filter. Air or gas which has been cleaned of its oil content passes through the filter and is recirculated as described above. Retained oil droplets tend to merge with other droplets retained by the filter to form droplets of increased size and, as they become more massive, the droplets are periodically ejected or flung from the filter in a generally radially outward direction as shown by the smaller arrows. There is a possibility for interaction between the inwardly directed oil-containing air/gas stream and the outwardly directed coalesced oil drops which is believed to enhance filtration efficiency. Drops of the oil flung from the filter element 16 impact onto the side of the body portion 4 and fall to the base of the pump body in the vicinity of the body portion 5. In this manner, the atmosphere within the chamber 11 is continuously recirculated through the filter 15 where the oil mist is coalesced into liquid and removed at each pass so that the concentration of oil mist within the chamber 11 is reduced to a low level. Because of the lowered oil mist concentration, the ability for oil to pass the piston rings 12 and into the pumping chambers above the body portion 3 is reduced.

It would be appreciated that it is important that the filter 15 should normally operate with a low pressure drop across it. In the construction shown, the scroll 24 creates an elevated pressure in chamber 11 which causes the flow of contaminated air through the filter. An excessive pressure drop causes a resistance to this flow, reducing the rate of filtration and permitting oil mist to build up in the chamber 11.

Figure 2:
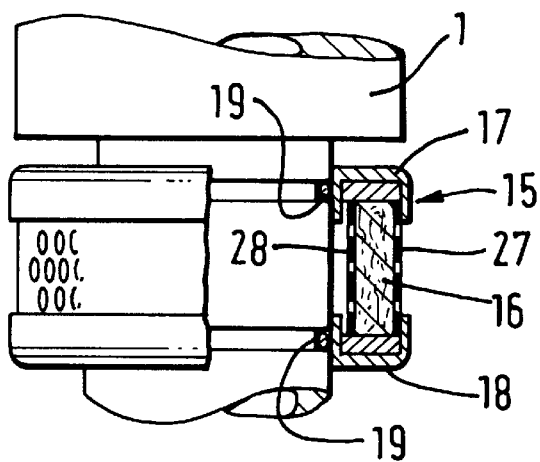
FIG. 2 is a view on an enlarged scale, half in section, of part of the rotary shaft of the gear box of FIG. 1 carrying the coalescing filter.

The filter element 15 is shown in greater detail in FIG. 2. The annular oil coalescing filter 16 may be fabricated or molded from a fibrous organic or inorganic material and preferably from a fibrous inorganic material such as glass microfibers. It should have a structure and pore size such that it will retain particles and droplets having a size from about 0.01 to about 10 microns and, in particular, particles of size less than about 1.5 microns which form a major component of oil suspended in air in a vacuum pump of the present kind. Suitable media commonly have an efficiency of between 99.97 and 99.9999% when subjected to a dioctyl phthalate test to ASTM D 1986–1971 (Military Standard 282). The coalesing filter may be formed from layers of sheet wrapped one around the other, formed from pleated sheet or, as is preferred in the present case, it is made by molding or vacuum forming. It will during manufacture normally be impregnated with a resin binder which imparts a degree of mechanical strength and is compatible with the coalescing action. Suitable media for the coalescing element are disclosed in patent specification numbers GB-A-1014882 (Domnick Hunter) and GB-A-1544822 and GB-A-1603519 (Process Scientific Innovations ). In particular, it is preferred that the filter element 16 should be molded from borosilicate glass microfibers according to the process described in GB-A-1603519.

The filter 15 which is typically of outside diameter 6 cm and length 3 cm is formed as a single component for convenience in fitting to or removal from the shaft 1. During manufacture, the inner and outer expanded metal supports 27, 28, are offered to the outer and inner surfaces of the element 16, after which the annular end caps 17, 18 are adhered thereto. The expanded metal supports 27, 28 are conveniently of expanded stainless steel mesh of thickness about 0.5 mm and open area 60%. The element 16 may be of borosilicate glass microfiber impregnated with an epoxy resin, the end caps 17, 18 may be machined from aluminum alloy, and they may be adhered to the filter element 16 and inner and outer supports 27, 28 by means of an epoxy adhesive, grades of which exhibit good resistance to chemical attack and have service temperatures of, for example, about 130° C. As an alternative polyurethane or phenolic adhesive can be used, the chemical resistance of phenolic adhesives being especially good.

Figure 3:
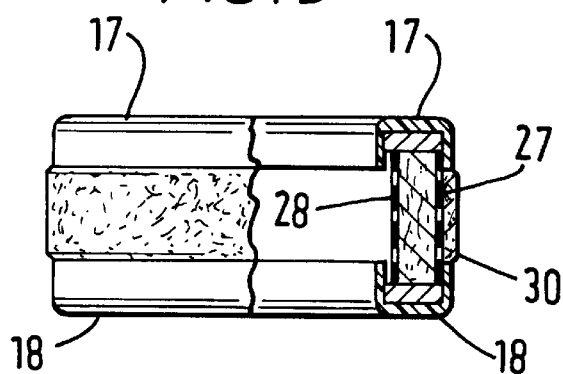
FIG. 3 is an enlarged, partly sectional view of a second form of coalescing filter.

In a variation shown in FIG. 3, the end cap 17, 18 may be made from a rigid plastics material, e.g. a 30% glass-filled polybutylene terephthalate and, on the outer face of the outer expanded metal support 27, there may be provided a drainage layer of large pore size organic woven, non-woven or foam material, e.g. of polyester needle felt, which drainage layer is treated with a fluorocarbon to reduce oil retention. Such drainage layers are disclosed in U.S. Pat. No. 5,129,923.

Figure 4:
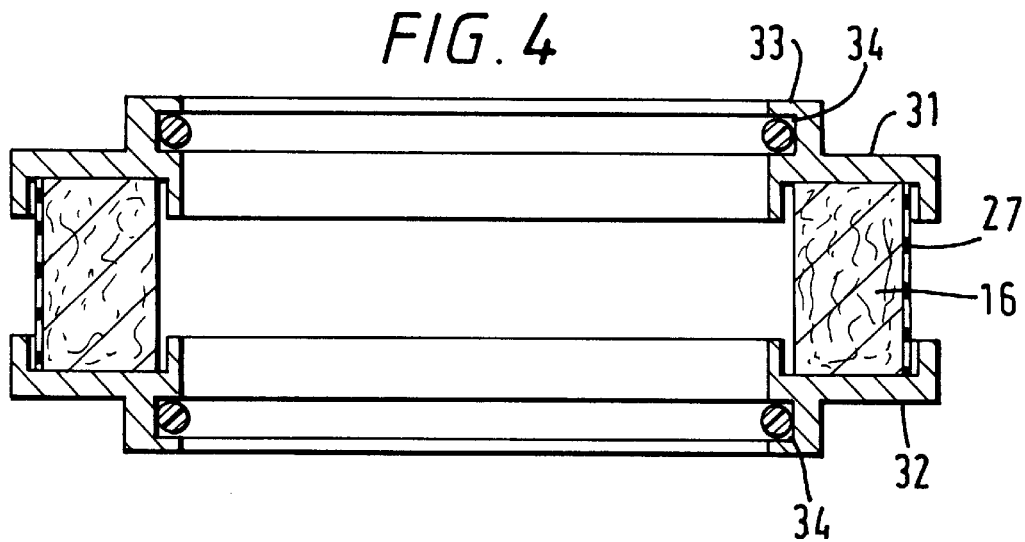
FIG. 4 is a sectional view of a third form of coalescing filter.

FIG. 4 shows a further variant in which the coalescing filter has only a single expanded metal support member 27 on the outer surface and is sandwiched between end caps 31, 32 which have axial extension 33 in which are formed retaining grooves 34 for O-ring seals. With this structure, the filter can be fitted onto a plain shaft and can be supplied complete with a fresh pair of O-ring scale which are held captive within the element and are replaced such time that the element is exchanged.

In a further variant shown in FIGS. 5 and 6, a splash guard fits over the outer cylindrical surface of the filter 15 covering a lower part of the outer surface for most of the axial extend of the exposed part. The splash guard 35 is an annulus of liquid-impermeable material formed with outwardly projecting louvers 37 which are formed with ports 39 at their trailing ends with reference to the direction of rotation as indicated by the arrow. It may conveniently be formed integrally with the lower end cap 35, as shown, and be molded from a suitable plastics material, e.g. glass-filled polybutylene terephatlate. It has been found that, when the shaft 1 is rotating at low speeds particularly during starting and stopping of the vacuum pump, the filter element 15 is likely to be splashed with oil which at these low rotation speeds is retained by the coalescing element 16 and contributes to pressure drop. The splash guard 35 reduces the likelihood of the coalescing element becoming directly splashed with oil and hence enables the filter to operate with a lower pressure drop during starting or at low running speeds, but it does not significantly impede ingress of contaminated air or ejection of coalesced oil droplets.

In FIG. 7, there is shown a further variant of the filter in which the end faces of end caps 17, 35, the lower end cap 35 incorporating an integral splash guard as aforesaid, are provided with axially extending seals 40, 41. The filter fits in a recess between radially enlarged portions 42, 43 of the rotating shaft, one of which is removable to permit the filter to be fitted and replaced. The use of axially extending face seals instead of the shaft seals in the previous embodiments permits a wider range of manufacturing tolerance for the axial spacing between end caps 17, 35 of the filter. In the embodiment shown, the seals 40, 41 are glued in place on the end caps 17, 35. In a variant, the end caps 17, 35 could be formed on their end surfaces with an axial extension having a molded in O-ring receiving groove similar to the groove in FIG. 4.

FIG. 8 shows an alternative form of the invention for use with a rotary shaft which intrudes into a closed hydraulic chamber or tank. As shown, an upper tank wall 60 closes off the internal space 61 of the tank at an aperture 62 through which shaft 1' extends. The shaft is rotatable by means of a fractional horsepower motor diagrammatically indicated at 63. The shaft 1' is formed with an axial bore 22' and radial bores 21', 23' as aforesaid. At its upper and lower ends are fitted an intake filter 45 and a coalescing filter 47, each having the same structure as the filter shown in FIG. 5. The filters 45, 47 are replaceably mounted on the shaft 1 by means of end caps 49 held in place by threaded studs 50. The intake filter 45 rotates within a mesh guard 52. As the level of liquid 54 within the space 61 falls, air is drawn into the space 61 through the inlet filter 45 where solid contaminants such as dust together with any liquid contaminants are filtered out. Clean air enters the space 61 through the filter 47. When the tank is refilled with hydraulic liquid 54, the direction of flow is recovered, end mist droplets are coalesced and returned to the main body of oil 54 by the mechanism previously described. In a modification, it is desired to filter the gas in space 61 continuously through the filter 47, the diameter of the inlet filter 45 is increased to a value greater than that of the coalescing filter 47, in which case the preferential direction of gas flow is into the filter 47 and out from the filter 45.

We claim:

1. A gearbox to drive machinery comprising: an internal space; a rotatable shaft located within said internal space and having a hollow interior; a coalescing filter carried by and rotatable with the rotatable shaft; and means separate and distinct from the machinery for circulating a flow of liquid-contaminated gas from the internal space through the filter and into the hollow interior of the shaft and from the hollow interior of the shaft back to the internal space; said coalescing filter configured so as to present a generally cylindrical exterior surface to the internal space for gas inflow into the filter from a generally radial direction and for generally radial ejection of coalesced liquid.

2. The gearbox of claim 1, wherein the coalescing filter comprises a microporous filter element.

3. The gearbox of claim 2, wherein the microporous filter element is a molded microfibrous filter element.

4. The gearbox of claim 2, wherein the filter element is a pleated microfibrous filter element.

5. The gearbox of claim 2, wherein the filter element is formed of wrapped sheets of microfibers.

6. The gearbox of claim 2, wherein the filter element comprises glass microfibers held together by means of a binder resin.

7. The gearbox of claim 1, wherein the coalescing filter comprises a microporous filter element and a rigid foraminous support member in contact with the outer surfaces of the microporous filter element.

8. The gearbox of claim 2, wherein the coalescing filter comprises a microfibrous filter element and rigid foraminous support members in contact respectively with the outer and inner surfaces of the microporous filter element.

9. The gearbox of claim 2, wherein end caps are adhesively attached to opposed ends of the microporous filter element.

10. The gearbox of claim 9, wherein the shaft carries first and second axially spaced seals which form gas-tight seals with the end caps.

11. The gearbox of claim 9, wherein the ends caps carry respective sealing members that form a gas-tight seal with the outer surface of the shaft.

12. The gearbox of claim 1, wherein the means for establishing a flow of liquid-contaminated gas through the filter causes at least a part of the gas cleaned by the filter to be returned into the space.

13. The gearbox of claim 1, wherein there is at least one pair of meshing gears by which the shaft is driven.

14. The gearbox of claim 1, which forms part of the gear drive mechanism for a vacuum pump and is contained in a chamber which is substantially isolated from pumping chambers of said pump.

* * * * *